Patented June 15, 1926.

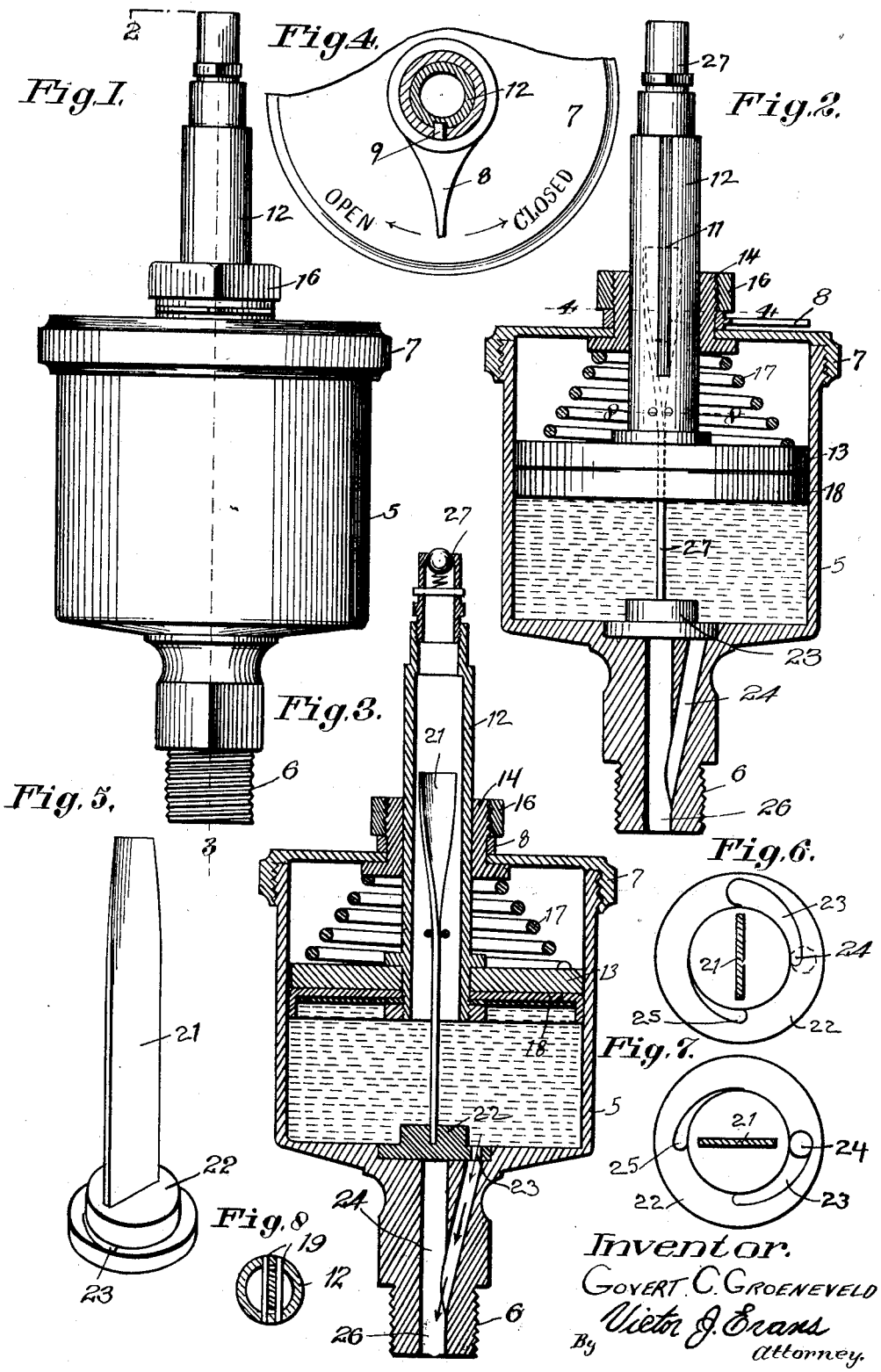

1,589,147

UNITED STATES PATENT OFFICE.

GOVERT C. GROENEVELD, OF HANFORD, CALIFORNIA.

GREASE CUP.

Application filed April 11, 1925. Serial No. 22,380.

This invention relates to improvements in grease cups.

The principal object of this invention is to provide means for automatically feeding a predetermined supply of oil or grease to the bearing, irrespective of the pressure exerted by the spring plunger.

Another object of this invention is to provide a grease cup which may be employed where the standard grease cup is employed without altering the construction of the machinery to which it is attached.

A further object is to produce a device of this character which is simple to construct and therefore cheap to manufacture.

A still further object is to produce a device which employs all the well known principles of engineering thereby assuring perfect operation.

Other objects and advantages will be apparent during the course of the following description.

In the accompanying drawings forming a part of this specification, and in which like numerals are employed to designate like parts throughout the same.

Figure 1 is a side elevation of a grease cup constructed in accordance with my invention, Figure 2 is a cross-section taken on the line 2—2 of Figure 1, showing the plunger in elevation, Figure 3 is a cross-section taken on the line 2—2 showing the plunger in cross-section, Figure 4 is a vertical top plan view taken on the line 4—4 of Figure 2, Figure 5 is a detail perspective view of the valve mechanism, Figures 6 and 7 show the valve mechanism in full closed and full open position, and Figure 8 is a cross-section taken on the line 8—8 of Figure 2.

In producing my grease cup it is my desire to have an even flow irrespective of the pressure exerted by the plunger and I accomplish this in a novel manner.

In the accompanying drawings wherein for the purpose of illustration is shown a preferred embodiment of my invention, the numeral 5 designates a casing having a threaded portion 6 common in all grease cups and adapted to be screwed to the machinery to be lubricated.

A cap 7 is threadedly engaged with the grease cup, which cap carries thereon an indicator 8 which indicator is provided with a pin 9 extending into a groove 11 formed in the tubular extension 12 of the plunger 13. A bushing 14 is retained in the cover 7 by a lock nut 16. A spring 17 is interposed between the cover 7 and the top of the plunger 13.

A backing 18 is secured to the underside of the plunger 13 and functions in the usual manner.

Pins 19 extend through the tubular extension 12 and serve as a guide for a valve vane 21. This valve vane carries at its bottom a disc 22 having two comet-shaped ports as shown at 23 and 25. One of these ports is adapted to be brought into registry with the passage 24 which, in turn, empties into a passage 26 from which point the lubricant flows to the part to be lubricated.

The extension 12 may be sealed or may carry a check valve arrangement as shown at 27. When sealed the device is filled with a lubricant by removing the cap 7 and its associated parts. When the extension is provided with a valve arrangement as shown at 27, the customary pipe of a pressure lubricating supply system may be attached thereto, and the device filled therefrom.

The result will be that the lubricant will pass down through the extension and force the plunger upwardly until the spring 17 is fully compressed.

The operation of my device is as follows:—

Assuming that the device is completely filled with lubricant and that the spring 17 is exerting its greatest pressure upon the piston 13 and it is desired to dispense the lubricant, the indicator 8 is moved from its closed position to an open position and assuming that it is winter time when the lubricant is naturally thicker, the indicator will be moved so as to bring the tip of the port 23 into registry with the passage 24. As the grease or lubricant is used up, the pressure of the spring 17 will become less and less as the plunger approaches the bottom of the casing. Therefore, to provide for the decrease of pressure and still to express the same amount of lubricant, I provide a twist in the vane 21, which twist causes the discs 22 to be rotated thereby uncovering a greater amount of the area of the passage 24, and thereby allowing the same quantity of grease to be expressed, irrespective of the pressure of the spring 17.

Assuming that it is summer time, the indicator is turned in such a manner that the tip of the port 25 overlies the passage 24, with the result that this smaller port will still permit the same quantity of lubricant to be dispensed due to its more fluid consistency.

Should I desire to entirely cut off the flow, I may do so by manipulating the indicator on the cap toward the word "Closed", as indicated in Figure 4. This moving of the indicator through the pin 9 will cause the tubular extension 12 to rotate carrying with it the pins 19, vane 21, and disc 22, thus moving the disc to such a position as to entirely close the passage 24.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim:—

1. In a grease cup, a casing, a cap secured to said casing, a passage connected with said casing, a valve positioned adjacent said passage, a tapered port formed in said valve and adapted to be moved into registry with said passage, a spiral vane secured to said valve, a plunger positioned in said casing, means carried on said plunger cooperating with said vane for rotating said valve when said plunger approaches said valve.

2. In a grease cup, a casing, a passage connected with said casing, a valve overlying said passage, said valve comprising a disc having a tapered port formed therein, said port being adapted to register with said passage, a vertically disposed tapered vane secured to said disc, said vane being spirally bent, a plunger positioned in said casing, a cap overlying said plunger and secured to said casing, a spring interposed between said plunger and said cap, a tubular extension secured to said plunger, pins positioned in said extension and adapted to lie on opposite sides of said vane, for the purpose of rotating said vane.

In testimony whereof I affix my signature.

GOVERT C. GROENEVELD.